United States Patent
Takahashi

(10) Patent No.: US 8,233,011 B2
(45) Date of Patent: Jul. 31, 2012

(54) HEAD MOUNTED DISPLAY AND CONTROL METHOD THEREFOR

(75) Inventor: Hiroshi Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1071 days.

(21) Appl. No.: 12/127,593

(22) Filed: May 27, 2008

(65) Prior Publication Data

US 2008/0297437 A1 Dec. 4, 2008

(30) Foreign Application Priority Data

May 31, 2007 (JP) ................................. 2007-146092

(51) Int. Cl.
*G09G 5/00* (2006.01)
(52) U.S. Cl. ........................................................ 345/633
(58) Field of Classification Search ................... 345/633
See application file for complete search history.

(56) References Cited

U.S. PATENT DOCUMENTS
2005/0035980 A1* 2/2005 Lonsing ........................ 345/633

FOREIGN PATENT DOCUMENTS
JP 07-311857 11/1995
JP 2004-109994 4/2004

* cited by examiner

*Primary Examiner* — Jeffery A Brier
(74) *Attorney, Agent, or Firm* — Cowan, Liebowitz & Latman, P.C.

(57) ABSTRACT

A viewpoint information calculation unit (710) calculates a difference value (α) between reference position and orientation information and position and orientation information held by a camera viewpoint storage unit (207), and a difference value (β) between the reference position and orientation information and position and orientation information held by a CG viewpoint storage unit (208). If |α|≧|β|, a physical space image is shifted by a shift amount calculated in accordance with the resolution of a display unit (213), a difference amount, and the angle of view of a camera (203), and is composited with a virtual space image. If |α|<|β|, the virtual space image is shifted by the shift amount, and is composited with the physical space image.

6 Claims, 8 Drawing Sheets

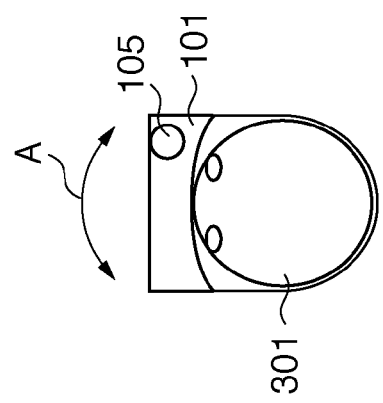
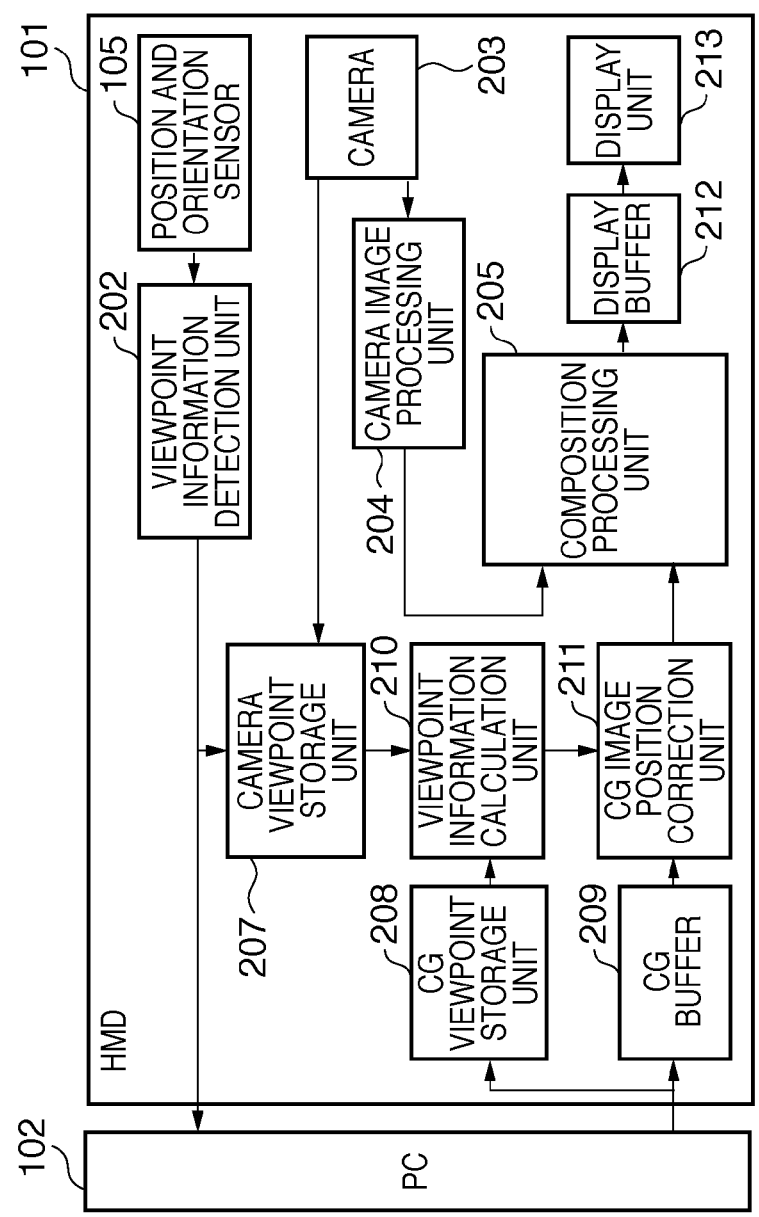

FIG. 5A-a
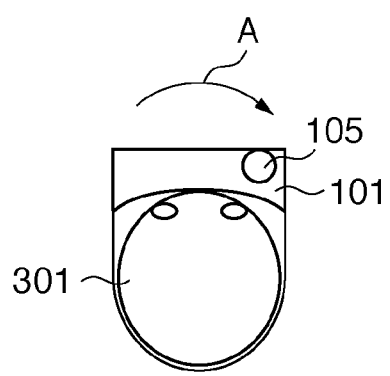
FIG. 5A-b
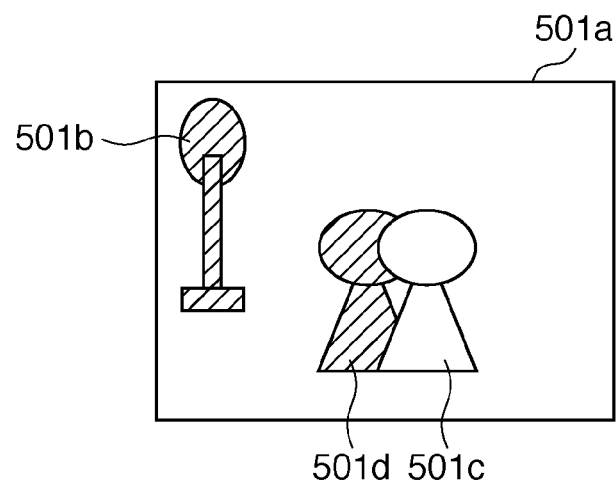
FIG. 5B-a
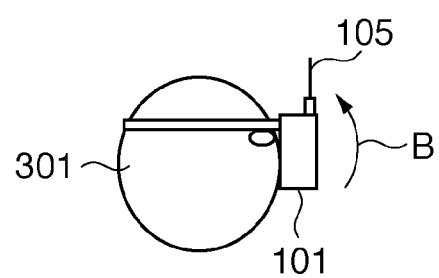
FIG. 5B-b
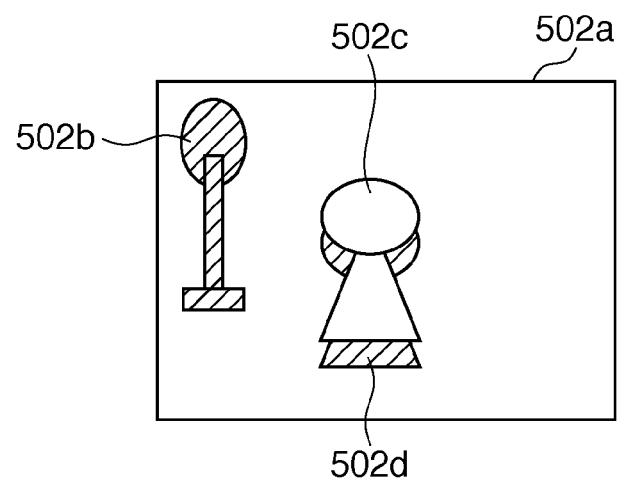

FIG. 5C-a
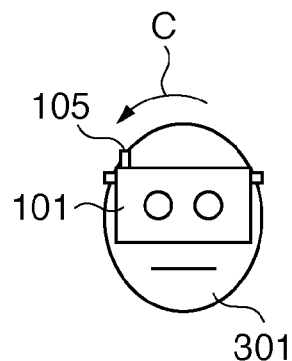
FIG. 5C-b
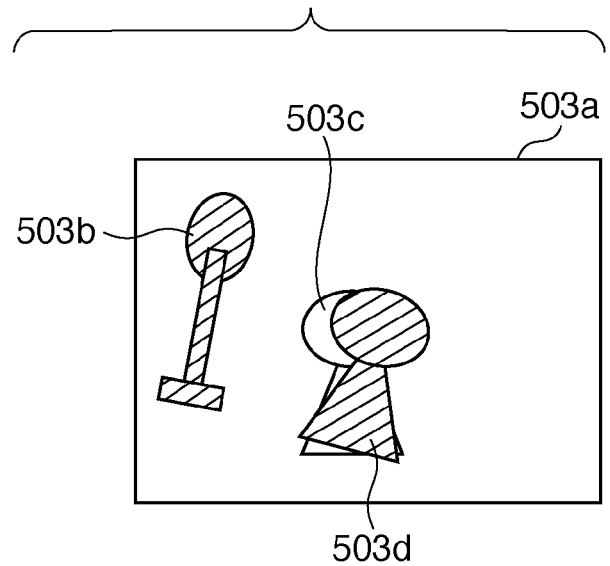
FIG. 6
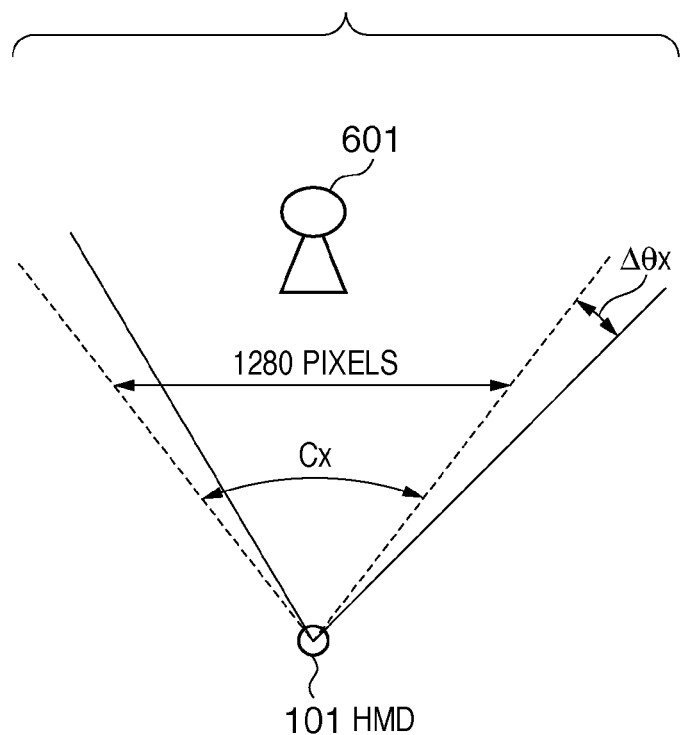

HEAD MOUNTED DISPLAY AND CONTROL METHOD THEREFOR

BACKGROUND OF THE INVENTION

1. Field of the Invention

The present invention relates to a technique of compositing a physical space image and a virtual space image.

2. Description of the Related Art

In recent years, studies about an MR (Mixed Reality) technique have been extensively made (see patent reference 1). In the MR technique, a physical space image is sensed by a camera worn by an observer on the head. A virtual space image (CG (Computer Graphics) image) is generated based on viewpoint information representing the position and orientation of the viewpoint of the observer at the time of sensing. The virtual space image is composited on the physical space image to generate a composite image. The composite image is then displayed on a display device worn by the observer on the head.

Processing executed in the composition process has been proposed. That is, a period of time required for creating a CG image is predicted. The amount of movement of the observer's head (viewpoint) until the predicted period of time elapses is predicted. The CG image is generated based on the viewpoint which has been moved by the predicted amount, and is composited with the physical space image (see patent reference 2).

[Patent Reference 1] Japanese Patent Laid-Open No. 07-311857

[Patent Reference 2] Japanese Patent Laid-Open No. 2004-109994

However, the following problems arise in a method of compositing a physical space image and a CG image generated based on viewpoint information at the time of sensing the physical space image, and displaying the composited image.

To generate and display a composite image of a physical space image and a CG image, a series of processes including a process of sensing the physical space image, that of generating the CG image, and that of compositing the physical space image and the CG image are required. This causes a delay in displaying the composite image after the physical space image is sensed, as a matter of course. In particular, when the viewpoint moves quickly, the delay is conspicuous.

In a method of creating a CG image in advance based on a predicted amount of movement of the observer's viewpoint and compositing the CG image on a physical space image, a delay due to the CG image creation process shortens. However, there is an error between the viewpoint in the CG image and that in the physical space image. As a result, the observer who observes the composite image obtained by compositing the physical space image and the CG image experiences an unnatural impression with respect to the CG image.

SUMMARY OF THE INVENTION

The present invention has been made in consideration of the above problems, and has as its object to provide a technique for, when a virtual space image and a physical space image are composited, decreasing a shift between the viewpoints in the images. Furthermore, the present invention has as its object to provide a technique for shortening the time required for the composition.

According to the first aspect of the present invention, there is provided a head mounted display including an image sensing device, a display device, and a position and orientation sensor, comprising: an acquisition unit adapted to acquire, every time receiving a physical space image sensed by the image sensing device, position and orientation information representing a position and orientation which has been measured by the position and orientation sensor at the time of sensing the received physical space image, and record the position and orientation information together with the received physical space image in a first memory; a transmission unit adapted to transmit the position and orientation information acquired by the acquisition unit to an external computer; a reception unit adapted to receive, from the computer, the position and orientation information transmitted by the transmission unit and a virtual space image generated by the computer on the basis of the position and orientation information, and record the received position and orientation information and the received virtual space image in a second memory; a calculation unit adapted to calculate a difference amount of an orientation component between the position and orientation information held in the first memory at a display timing of the display device and the position and orientation information held in the second memory at the display timing; a unit adapted to calculate a first difference value between the position and orientation information acquired by the acquisition unit at around the display timing of the display device and the position and orientation information held in the first memory; a unit adapted to calculate a second difference value between the position and orientation information acquired by the acquisition unit at around the display timing of the display device and the position and orientation information held in the second memory; and a composition unit adapted to composite the physical space image held in the first memory at the display timing of the display device and the virtual space image held in the second memory at the display timing of the display device, and wherein the composition unit selects, based on a magnitude relationship between the first difference value and the second difference value, either a composition process of shifting a virtual space image to be composited by a shift amount calculated in accordance with resolution information representing a resolution of the display device, the difference amount, and angle-of-view information representing an angle of view of the image sensing device and compositing the shifted virtual space image, or a composition process of shifting a physical space image to be composited by a shift amount calculated in accordance with the resolution information representing the resolution of the display device, the difference amount, and the angle-of-view information representing the angle of view of the image sensing device and compositing the shifted physical space image, and the composition unit executes the selected composition process.

According to the second aspect of the present invention, there is provided a head mounted display including an image sensing device, a display device, and a position and orientation sensor, comprising: an acquisition unit adapted to acquire, every time receiving a physical space image sensed by the image sensing device, position and orientation information representing a position and orientation which has been measured by the position and orientation sensor at the time of sensing the received physical space image, and record the position and orientation information together with the received physical space image in a first memory; a transmission unit adapted to transmit the position and orientation information acquired by the acquisition unit to an external computer; a reception unit adapted to receive, from the computer, the position and orientation information transmitted by the transmission unit and a virtual space image generated by the computer on the basis of the position and orientation information, and record the received position and orientation information and the received virtual space image in a second memory; a unit adapted to calculate a first difference value between the position and orientation information acquired by the acquisition unit at around a display timing of the display device and the position and orientation information held in the first memory; a unit adapted to calculate a second difference value between the position and orientation information acquired by the acquisition unit at around the display timing of the display device and the position and orientation information held in the second memory; a unit adapted to shift the physical space image held in the first memory at the display timing of the display device by a shift amount calculated in accordance with resolution information representing a resolution of the display device, the first difference value, and angle-of-view information representing an angle of view of the image sensing device, and composite the shifted physical space image with the virtual space image held in the second memory at the display timing of the display device; and a unit adapted to shift the virtual space image held in the second memory at the display timing of the display device by a shift amount calculated in accordance with the resolution information representing the resolution of the display device, the second difference value, and the angle-of-view information representing the angle of view of the image sensing device, and composite the shifted virtual space image with the physical space image held in the first memory at the display timing of the display device.

According to the third aspect of the present invention, there is provided a control method for a head mounted display including an image sensing device, a display device, and a position and orientation sensor, comprising: an acquisition step of acquiring, every time receiving a physical space image sensed by the image sensing device, position and orientation information representing a position and orientation which has been measured by the position and orientation sensor at the time of sensing the received physical space image, and recording the position and orientation information together with the received physical space image in a first memory; a transmission step of transmitting the position and orientation information acquired in the acquisition step to an external computer; a reception step of receiving, from the computer, the position and orientation information transmitted in the transmission step and a virtual space image generated by the computer on the basis of the position and orientation information, and recording the received position and orientation information and the received virtual space image in a second memory; a calculation step of calculating a difference amount of an orientation component between the position and orientation information held in the first memory at a display timing of the display device and the position and orientation information held in the second memory at the display timing; a step of calculating a first difference value between the position and orientation information acquired in the acquisition step at around the display timing of the display device and the position and orientation information held in the first memory; a step of calculating a second difference value between the position and orientation information acquired in the acquisition step at around the display timing of the display device and the position and orientation information held in the second memory; and a composition step of compositing the physical space image held in the first memory at the display timing of the display device and the virtual space image held in the second memory at the display timing of the display device, and wherein the composition step includes, a step of selecting, based on a magnitude relationship between the first difference value and the second difference value, either a composition process of shifting a virtual space image to be composited by a shift amount calculated in accordance with resolution information representing a resolution of the display device, the difference amount, and angle-of-view information representing an angle of view of the image sensing device and compositing the shifted virtual space image, or a composition process of shifting a physical space image to be composited by the shift amount calculated in accordance with the resolution information representing the resolution of the display device, the difference amount, and the angle-of-view information representing the angle of view of the image sensing device and compositing the shifted physical space image, and a step of executing the selected composition process.

According to the fourth aspect of the present invention, there is provided a control method for a head mounted display including an image sensing device, a display device, and a position and orientation sensor, comprising: an acquisition step of acquiring, every time receiving a physical space image sensed by the image sensing device, position and orientation information representing a position and orientation which has been measured by the position and orientation sensor at the time of sensing the received physical space image, and recording the position and orientation information together with the received physical space image in a first memory; a transmission step of transmitting the position and orientation information acquired in the acquisition step to an external computer; a reception step of receiving, from the computer, the position and orientation information transmitted in the transmission step and a virtual space image generated by the computer on the basis of the position and orientation information, and recording the received position and orientation information and the received virtual space image in a second memory; a step of calculating a first difference value between the position and orientation information acquired in the acquisition step at around a display timing of the display device and the position and orientation information held in the first memory; a step of calculating a second difference value between the position and orientation information acquired in the acquisition step at around the display timing of the display device and the position and orientation information held in the second memory; a step of shifting the physical space image held in the first memory at the display timing of the display device by a shift amount calculated in accordance with resolution information representing a resolution of the display device, the first difference value, and angle-of-view information representing an angle of view of the image sensing device, and compositing the shifted physical space image with the virtual space image held in the second memory at the display timing of the display device; and a step of shifting the virtual space image held in the second memory at the display timing of the display device by a shift amount calculated in accordance with the resolution information representing the resolution of the display device, the second difference value, and the angle-of-view information representing the angle of view of the image sensing device, and compositing the shifted virtual space image with the physical space image held in the first memory at the display timing of the display device.

According to the fifth aspect of the present invention, there is provided a head mounted display including an image sensing device, a display device, and a position and orientation sensor, comprising: a first acquisition unit adapted to acquire a physical space image sensed by the image sensing device; a second acquisition unit adapted to acquire position and orientation information representing a position and orientation which has been measured by the position and orientation sensor at the time of sensing the physical space image; a transmission unit adapted to transmit the position and orientation information acquired by the second acquisition unit to an external computer; a reception unit adapted to receive, from the computer, the position and orientation information transmitted by the transmission unit and a virtual space image generated by the computer on the basis of the position and orientation information; a calculation unit adapted to calculate a difference amount of an orientation component between the position and orientation information which has been received by the reception unit and the position and orientation information which has been acquired by the second acquisition unit at the time of receiving the position and orientation information; a composition unit adapted to, when the virtual space image received by the reception unit is composited on the physical space image acquired by the first acquisition unit at the time of receiving the position and orientation information by the reception unit, shift a composition position of the virtual space image by a shift amount calculated in accordance with resolution information representing a resolution of the display device, the difference amount, and angle-of-view information representing an angle of view of the image sensing device, and composite the shifted virtual space image on the physical space image; and an output unit adapted to output a composite image by the composition unit to the display device.

According to the sixth aspect of the present invention, there is provided a control method for a head mounted display including an image sensing device, a display device, and a position and orientation sensor, comprising: a first acquisition step of acquiring a physical space image sensed by the image sensing device; a second acquisition step of acquiring position and orientation information representing a position and orientation which has been measured by the position and orientation sensor at the time of sensing the physical space image; a transmission step of transmitting the position and orientation information acquired in the second acquisition step to an external computer; a reception step of receiving, from the computer, the position and orientation information transmitted in the transmission step and a virtual space image generated by the computer on the basis of the position and orientation information; a calculation step of calculating a difference amount of an orientation component between the position and orientation information which has been received in the reception step and the position and orientation information which has been acquired in the second acquisition step at the time of receiving the position and orientation information; a composition step of, when the virtual space image received in the reception step is composited on the physical space image acquired in the first acquisition step at the time of receiving the position and orientation information in the reception step, shifting a composition position of the virtual space image by a shift amount calculated in accordance with resolution information representing a resolution of the display device, the difference amount, and angle-of-view information representing an angle of view of the image sensing device, and compositing the shifted virtual space image on the physical space image; and an output step of outputting a composite image in the composition step to the display device.

According to the seventh aspect of the present invention, there is provided an apparatus including an image sensing device, a display device, and a position and orientation sensor, comprising: an acquisition unit adapted to acquire, every time receiving a physical space image sensed by the image sensing device, position and orientation information representing a position and orientation which has been measured by the position and orientation sensor at the time of sensing the received physical space image, and record the position and orientation information together with the received physical space image in a first memory; a transmission unit adapted to transmit the position and orientation information acquired by the acquisition unit to an external computer; a reception unit adapted to receive, from the computer, the position and orientation information transmitted by the transmission unit and a virtual space image generated by the computer on the basis of the position and orientation information, and record the received position and orientation information and the received virtual space image in a second memory; a calculation unit adapted to calculate a difference amount of an orientation component between the position and orientation information held in the first memory at a display timing of the display device and the position and orientation information held in the second memory at the display timing; a unit adapted to calculate a first difference value between the position and orientation information acquired by the acquisition unit at around the display timing of the display device and the position and orientation information held in the first memory; a unit adapted to calculate a second difference value between the position and orientation information acquired by the acquisition unit at around the display timing of the display device and the position and orientation information held in the second memory; and a composition unit adapted to composite the physical space image held in the first memory at the display timing of the display device and the virtual space image held in the second memory at the display timing of the display device, and wherein the composition unit selects, based on a magnitude relationship between the first difference value and the second difference value, either a composition process of shifting a virtual space image to be composited by a shift amount calculated in accordance with resolution information representing a resolution of the display device, the difference amount, and angle-of-view information representing an angle of view of the image sensing device and compositing the shifted virtual space image, or a composition process of shifting a physical space image to be composited by a shift amount calculated in accordance with the resolution information representing the resolution of the display device, the difference amount, and the angle-of-view information representing the angle of view of the image sensing device and compositing the shifted physical space image, and the composition unit executes the selected composition process.

According to the eighth aspect of the present invention, there is provided an apparatus including an image sensing device, a display device, and a position and orientation sensor, comprising: an acquisition unit adapted to acquire, every time receiving a physical space image sensed by the image sensing device, position and orientation information representing a position and orientation which has been measured by the position and orientation sensor at the time of sensing the received physical space image, and record the position and orientation information together with the received physical space image in a first memory; a transmission unit adapted to transmit the position and orientation information acquired by the acquisition unit to an external computer; a reception unit adapted to receive, from the computer, the position and orientation information transmitted by the transmission unit and a virtual space image generated by the computer on the basis of the position and orientation information, and record the received position and orientation information and the received virtual space image in a second memory; a unit adapted to calculate a first difference value between the position and orientation information acquired by the acquisition unit at around a display timing of the display device and the position and orientation information held in the first memory; a unit adapted to calculate a second difference value between the position and orientation information acquired by the acquisition unit at around the display timing of the display device and the position and orientation information held in the second memory; a unit adapted to shift the physical space image held in the first memory at the display timing of the display device by a shift amount calculated in accordance with resolution information representing a resolution of the display device, the first difference value, and angle-of-view information representing an angle of view of the image sensing device, and composite the shifted physical space image with the virtual space image held in the second memory at the display timing of the display device; and a unit adapted to shift the virtual space image held in the second memory at the display timing of the display device by a shift amount calculated in accordance with the resolution information representing the resolution of the display device, the second difference value, and the angle-of-view information representing the angle of view of the image sensing device, and composite the shifted virtual space image with the physical space image held in the first memory at the display timing of the display device.

According to the ninth aspect of the present invention, there is provided a control method for an apparatus including an image sensing device, a display device, and a position and orientation sensor, comprising: an acquisition step of acquiring, every time receiving a physical space image sensed by the image sensing device, position and orientation information representing a position and orientation which has been measured by the position and orientation sensor at the time of sensing the received physical space image, and recording the position and orientation information together with the received physical space image in a first memory; a transmission step of transmitting the position and orientation information acquired in the acquisition step to an external computer; a reception step of receiving, from the computer, the position and orientation information transmitted in the transmission step and a virtual space image generated by the computer on the basis of the position and orientation information, and recording the receiving position and orientation information and the receiving virtual space image in a second memory; a calculation step of calculating a difference amount of an orientation component between the position and orientation information held in the first memory at a display timing of the display device and the position and orientation information held in the second memory at the display timing; a step of calculating a first difference value between the position and orientation information acquired in the acquisition step at around the display timing of the display device and the position and orientation information held in the first memory; a step of calculating a second difference value between the position and orientation information acquired in the acquisition step at around the display timing of the display device and the position and orientation information held in the second memory; and a composition step of compositing the physical space image held in the first memory at the display timing of the display device and the virtual space image held in the second memory at the display timing of the display device, and wherein in the composition step includes, a step of selecting, based on a magnitude relationship between the first difference value and the second difference value, either a composition process of shifting a virtual space image to be composited by a shift amount calculated in accordance with resolution information representing a resolution of the display device, the difference amount, and angle-of-view information representing an angle of view of the image sensing device and compositing the shifted virtual space image, or a composition process of shifting a physical space image to be composited by the shift amount calculated in accordance with the resolution information representing the resolution of the display device, the difference amount, and the angle-of-view information representing the angle of view of the image sensing device and compositing the shifted physical space image, and a step of executing the selected composition process.

According to the tenth aspect of the present invention, there is provided a control method for an apparatus including an image sensing device, a display device, and a position and orientation sensor, comprising: an acquisition step of acquiring, every time receiving a physical space image sensed by the image sensing device, position and orientation information representing a position and orientation which has been measured by the position and orientation sensor at the time of sensing the received physical space image, and recording the position and orientation information together with the received physical space image in a first memory; a transmission step of transmitting the position and orientation information acquired in the acquisition step to an external computer; a reception step of receiving, from the computer, the position and orientation information transmitted in the transmission step and a virtual space image generated by the computer on the basis of the position and orientation information, and recording the received position and orientation information and the received virtual space image in a second memory; a step of calculating a first difference value between the position and orientation information acquired in the acquisition step at around a display timing of the display device and the position and orientation information held in the first memory; a step of calculating a second difference value between the position and orientation information acquired in the acquisition step at around the display timing of the display device and the position and orientation information held in the second memory; a step of shifting the physical space image held in the first memory at the display timing of the display device by a shift amount calculated in accordance with resolution information representing a resolution of the display device, the first difference value, and angle-of-view information representing an angle of view of the image sensing device, and compositing the shifted physical space image with the virtual space image held in the second memory at the display timing of the display device; and a step of shifting the virtual space image held in the second memory at the display timing of the display device by a shift amount calculated in accordance with the resolution information representing the resolution of the display device, the second difference value, and the angle-of-view information representing the angle of view of the image sensing device, and compositing the shifted virtual space image with the physical space image held in the first memory at the display timing of the display device.

According to the eleventh aspect of the present invention, there is provided an apparatus including an image sensing device, a display device, and a position and orientation sensor, comprising:

a first acquisition unit adapted to acquire a physical space image sensed by the image sensing device;

a second acquisition unit adapted to acquire position and orientation information representing a position and orientation which has been measured by the position and orientation sensor at the time of sensing the physical space image; a transmission unit adapted to transmit the position and orientation information acquired by the second acquisition unit to an external computer; a reception unit adapted to receive, from the computer, the position and orientation information transmitted by the transmission unit and a virtual space image generated by the computer on the basis of the position and orientation information; a calculation unit adapted to calculate a difference amount of an orientation component between the position and orientation information which has been received by the reception unit and the position and orientation information which has been acquired by the second acquisition unit at the time of receiving the position and orientation information; a composition unit adapted to, when the virtual space image received by the reception unit is composited on the physical space image acquired by the first acquisition unit at the time of receiving the position and orientation information by the reception unit, shift a composition position of the virtual space image by a shift amount calculated in accordance with resolution information representing a resolution of the display device, the difference amount, and angle-of-view information representing an angle of view of the image sensing device, and composite the shifted virtual space image on the physical space image; and an output unit adapted to output a composite image by the composition unit to the display device.

According to the twelfth aspect of the present invention, there is provided a control method for an apparatus including an image sensing device, a display device, and a position and orientation sensor, comprising: a first acquisition step of acquiring a physical space image sensed by the image sensing device; a second acquisition step of acquiring position and orientation information representing a position and orientation which has been measured by the position and orientation sensor at the time of sensing the physical space image; a transmission step of transmitting the position and orientation information acquired in the second acquisition step to an external computer; a reception step of receiving, from the computer, the position and orientation information transmitted in the transmission step and a virtual space image generated by the computer on the basis of the position and orientation information; a calculation step of calculating a difference amount of an orientation component between the position and orientation information which has been received in the reception step and the position and orientation information which has been acquired in the second acquisition step at the time of receiving the position and orientation information; a composition step of, when the virtual space image received in the reception step is composited on the physical space image acquired in the first acquisition step at the time of receiving the position and orientation information in the reception step, shifting a composition position of the virtual space image by a shift amount calculated in accordance with resolution information representing a resolution of the display device, the difference amount, and angle-of-view information representing an angle of view of the image sensing device, and compositing the shifted virtual space image on the physical space image; and an output step of outputting a composite image in the composition step to the display device.

Further features of the present invention will become apparent from the following description of exemplary embodiments with reference to the attached drawings.

BRIEF DESCRIPTION OF THE DRAWINGS

FIG. 2 is a block diagram showing the functional arrangement of an HMD 101;

FIG. 3 is a view when a head 301 of an observer wearing the HMD 101 on the head is viewed from above;

FIGS. 5A-a and 5A-b are views for explaining a composite image when the observer turns his/her head 301 clockwise in the horizontal direction;

FIGS. 5B-a and 5B-b are views for explaining a composite image when the observer moves his/her head 301 in the vertical direction;

FIGS. 5C-a and 5C-b are views for explaining a composite image when the observer rotates (inclines) his/her head 301 about the center of his/her face in a rolling direction;

FIG. 6 is a view for explaining a process for eliminating a composition position shift of a CG image, which occurs in a physical space image due to the movement of the head 301;

DESCRIPTION OF THE EMBODIMENTS

Preferred embodiments of the present invention will be described in detail hereinafter with reference to the accompanying drawings. Note that these embodiments will be described as examples of preferred arrangements of the invention described in the scope of claims, and the invention is not limited to the embodiments to be described hereinafter.

First Embodiment

Figure 1:
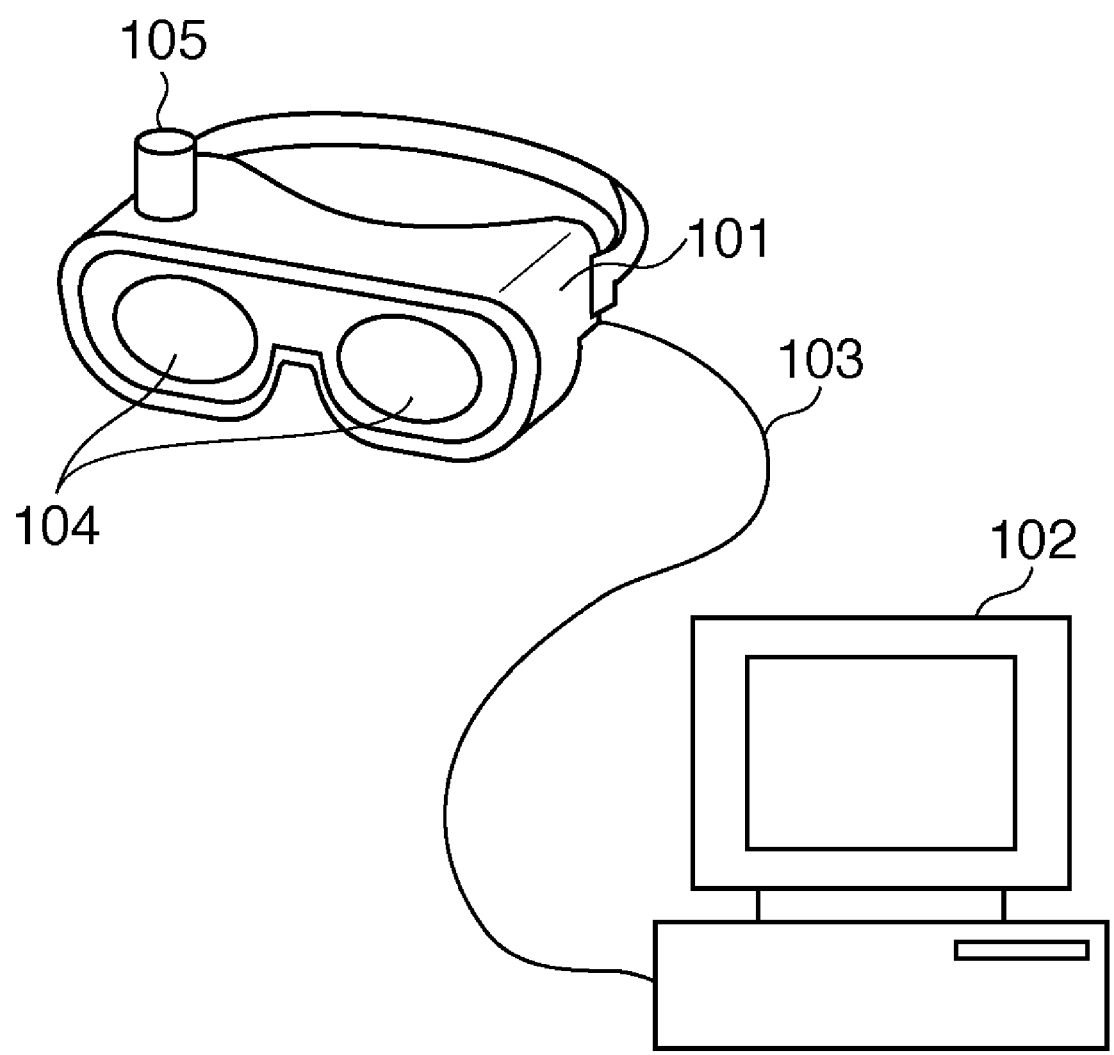
FIG. 1 is a view showing the outer appearance of a system to which a head mounted display (HMD) according to the first embodiment of the present invention is applied.

FIG. 1 is a view showing the outer appearance of a system to which a head mounted display (HMD) according to this embodiment is applied. As shown in FIG. 1, the system according to this embodiment comprises an HMD 101 and a PC (Personal Computer) 102. The HMD 101 and the PC 102 are connected with each other via a cable 103. The connection method between the HMD 101 and the PC 102 is not limited to this, and either a wired or wireless connection method may be used.

The HMD 101 will be described first. As is well known, the HMD 101 is worn by an observer on the head.

Reference numeral 105 denotes a position and orientation sensor which measures the position and orientation of itself. As this position and orientation sensor 105, various sensors such as an optical sensor, mechanical sensor, and ultrasonic sensor are applicable. In this embodiment, a magnetic sensor is used as the position and orientation sensor 105. In this case, the position and orientation sensor 105 operates as follows.

A magnetic source (not shown) is located at a predetermined position in a physical space. The position and orientation sensor 105 senses a magnetic field corresponding to the position and orientation of itself in the magnetic field generated by the magnetic source. A signal representing the sensing result is sent to a sensor controller (not shown). The sensor controller calculates the position and orientation of the position and orientation sensor 105 in a sensor coordinate system based on the signal. The sensor coordinate system has the position of the magnetic source as an origin, and defines three axes which are orthogonal to each other at that origin as x-, y-, and z-axes. The sensor controller sends position and orientation information representing the calculated position and orientation to the PC 102. If a world coordinate system matches the sensor coordinate system, the position and orientation measured by the position and orientation sensor 105 represents that in the world coordinate system. The world coordinate system has the predetermined position in the physical space as an origin, and defines three axes which are orthogonal to each other at that origin as x-, y- and z-axes. If the world coordinate system does not match the sensor coordinate system, a position and orientation relationship between the sensor coordinate system and the world coordinate system is measured in advance. The position and orientation measured by the position and orientation sensor 105 is converted using the position and orientation relationship, and the converted position and orientation is used as that in the world coordinate system. Note that there are various techniques for acquiring the position and orientation of the position and orientation sensor 105 in the world coordinate system, and a description thereof will be omitted. For descriptive convenience, in this embodiment, assume that the sensor coordinate system matches the world coordinate system, and that the position and orientation measured by the position and orientation sensor 105 represents that in the world coordinate system.

The position and orientation may be calculated by integrating an output value of a gyro sensor or an acceleration sensor, or may be calculated from a physical space image sensed by an image sensing device (to be described later). A combination of the calculation methods may be used, as a matter of course.

The HMD 101 includes an image sensing device for sensing a physical space image provided to the right eye of the observer wearing the HMD 101 on the head, and an image sensing device for sensing a physical space image provided to the left eye. Each of the image sensing devices is a video camera which senses an image (movie) in the physical space. Each of the image sensing devices senses the physical space via an image sensing window 104. Although there are two image sensing devices one for each of the right and left eyes, one image sensing device may be used for both right and left eyes.

The HMD 101 includes a display device for providing an image to the right eye of the observer wearing the HMD 101 on the head, and a display device for providing an image to the left eye. Although there are two display devices—one for each of the right and left eyes, one display device may be used for both right and left eyes.

Figure 8:
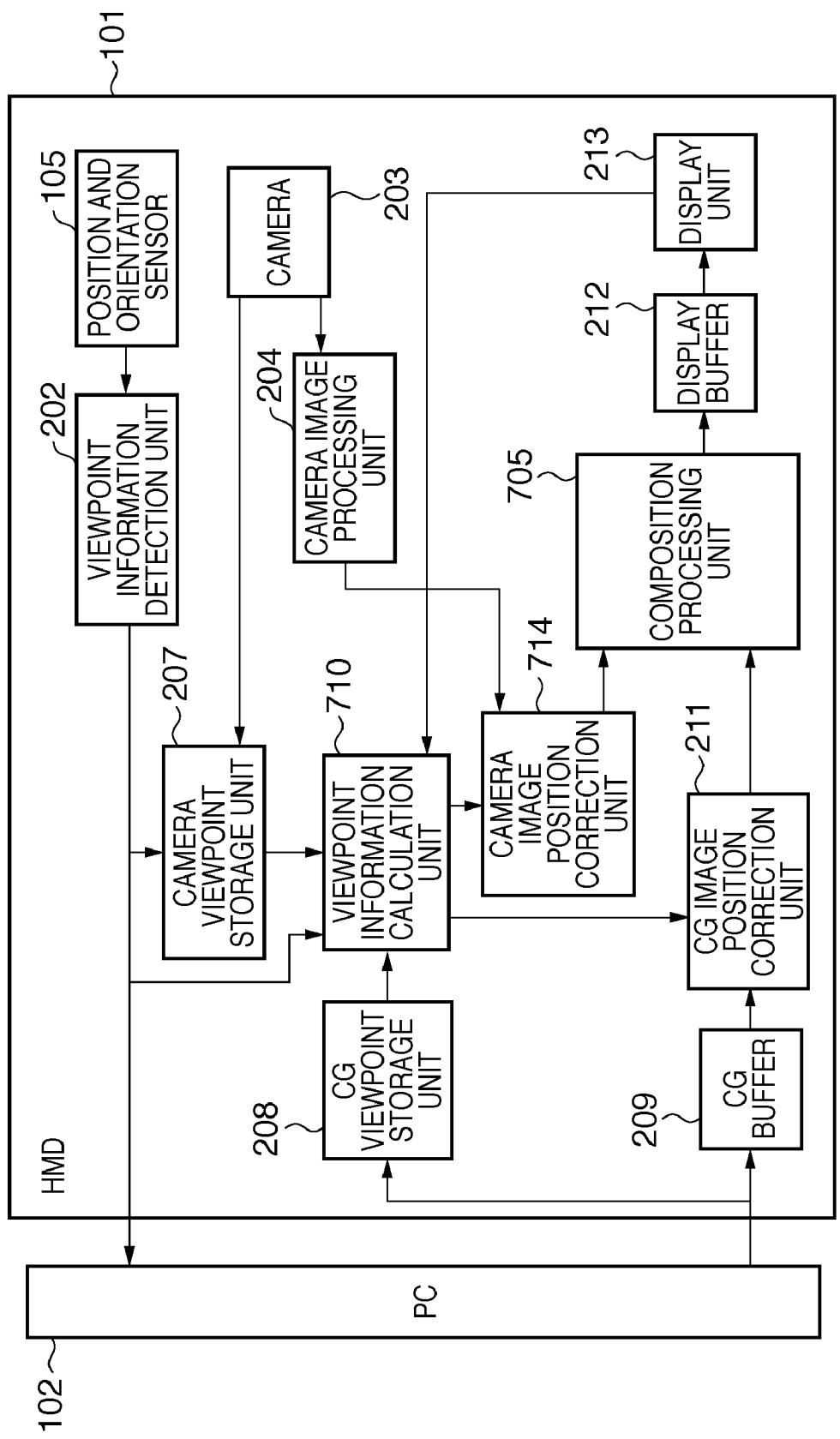
FIG. 8 is a block diagram showing a functional arrangement of the HMD 101 according to the first embodiment of the present invention.

The detailed arrangement of the HMD 101 will be described next. FIG. 8 is a block diagram showing the functional arrangement of the HMD 101 according to this embodiment. Note that in FIG. 8, the same reference numerals as those in FIG. 1 denote the same components, and a description thereof will be omitted.

Of components of the HMD 101 in FIG. 8, all the components except for the position and orientation sensor 105 are provided for each of the right and left eyes of the observer wearing the HMD 101 on the head. Although only the components of the HMD 101 for one eye are shown in FIG. 8, similar components are also provided in the HMD 101 for the other eye. Each component executes operations to be described below.

A viewpoint information detection unit 202 receives position and orientation information representing the position and orientation measured by the position and orientation sensor 105, and transfers the information to the PC 102 without any change. If the world coordinate system does not match the sensor coordinate system, the unit 202 converts, by using the position and orientation relationship between the sensor coordinate system and the world coordinate system, the position and orientation measured by the position and orientation sensor 105 to calculate position and orientation information. The unit 202 sends the calculated position and orientation information to the PC 102.

Upon reception of the position and orientation information from the viewpoint information detection unit 202, the PC 102 adds a position and orientation relationship between the position and orientation sensor 105 and a camera 203, which has been calculated in advance, to the position and orientation represented by the received position and orientation information. This makes it possible to calculate position and orientation information representing the position and orientation of the camera 203 (viewpoint). The PC 102 sets the viewpoint having the position and orientation of the camera 203 in a virtual space. Assume that a coordinate system in the virtual space matches the world coordinate system. Assume also that one or more virtual objects form the virtual space. The PC 102 generates an image (CG image) (virtual space image) of the virtual space seen from the set viewpoint. A process for generating an image of the virtual space seen from the viewpoint having the predetermined position and orientation is known, and a description thereof will be omitted. Together with the generated CG image data, the PC 102 returns, to the HMD 101, the position and orientation information which has been received from the viewpoint information detection unit 202 to generate the CG image.

The CG image data transmitted to the HMD 101 is stored in a CG buffer 209 (the second memory) and the position and orientation information returned to the HMD 101 is stored in a CG viewpoint storage unit 208 (the second memory). The CG buffer 209 and the CG viewpoint storage unit 208 are integrated in a single memory. In any case, the CG image data and the position and orientation information which has been received from the viewpoint information detection unit 202 to generate the CG image are held in association with each other.

Images (physical space images) of frames sensed by the camera 203 are sequentially sent to subsequent camera image processing unit 204 and camera viewpoint storage unit 207 (the first memory).

Upon reception of a physical space image from the camera 203, the camera viewpoint storage unit 207 pairs the received physical space image and the position and orientation information which has been received from the viewpoint information detection unit 202 at almost the reception timing of the physical space image, and holds them.

The camera image processing unit 204 executes known correction processing on the physical space image received from the camera 203. The camera image processing unit 204 sends the corrected physical space image to a subsequent camera image position correction unit 714.

When compositing the CG image stored in the CG buffer 209 and the physical space image output from the camera image processing unit 204, in a process to be described later, a viewpoint information calculation unit 710 calculates a "shift amount" by which the CG image or physical space image is shifted to be composited on the other.

A CG image position correction unit 211 shifts the CG image stored in the CG buffer 209 by the shift amount received from the viewpoint information calculation unit 710, and sends the processed CG image to a subsequent composition processing unit 705.

The camera image position correction unit 714 shifts the physical space image received from the camera image processing unit 204 by the shift amount received from the viewpoint information calculation unit 710, and sends the processed physical space image to the subsequent composition processing unit 705.

The composition processing unit 705 executes a process of compositing the CG image sent from the CG image position correction unit 211 and the physical space image sent from the camera image position correction unit 714. In the composition process, the composition position of the CG image or physical space image is a position shifted from a true composition position by the shift amount calculated by the viewpoint information calculation unit 710. A composite image generated by the composition process is rendered on a display buffer 212.

The composite image rendered on the display buffer 212 is displayed on a display unit (display device) 213.

A shift between a physical space image and a CG image, according to the movement of the head of the observer wearing the HMD 101 on the head will be described here with reference to FIGS. 3 to 5C.

FIG. 3 is a view when a head 301 of the observer wearing the HMD 101 on the head is viewed from above. Referring to FIG. 3, the observer pans his/her head 301 in the horizontal direction as indicated by an arrow A. The HMD 101 is fixed on the observer's head 301. Therefore, if the observer pans his/her head 301 in the horizontal direction, the HMD 101 (and the components of the HMD 101) also pans in the horizontal direction.

Figure 4:
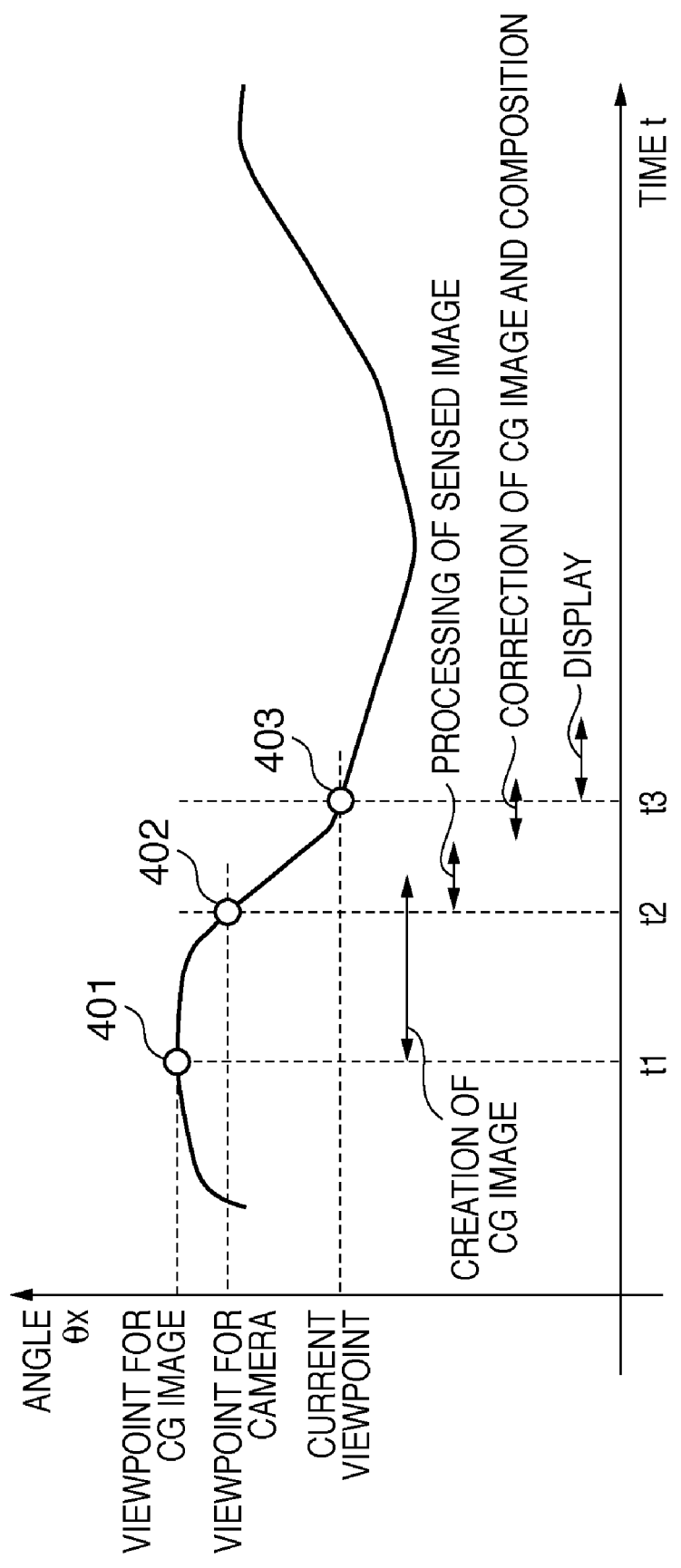
FIG. 4 is a graph showing an example when pieces of orientation information (angles within a horizontal plane) θx sequentially acquired from a position and orientation sensor 105 are plotted along the ordinate and the time of acquiring the pieces of orientation information is plotted along the abscissa.

FIG. 4 is a graph showing an example when pieces of orientation information (angles within a horizontal plane) θx sequentially acquired from the position and orientation sensor 105 are plotted along the ordinate and the time of acquiring the pieces of orientation information is plotted along the abscissa. When the observer pans his/her head 301 in the horizontal direction as shown in FIG. 3, the plotted angles of the head 301 within the horizontal plane form a sine wave with time.

A time t1 indicates a timing when the PC 102 calculates the position and orientation of the camera 203 (the viewpoint for the CG image) based on the position and orientation information received from the viewpoint information detection unit 202. As indicated by a point 401, the position and orientation of the viewpoint for the CG image is calculated at the time t1.

A time t2 indicates a timing when the PC 102 stores the CG image data in the CG buffer 209. The difference between the times t1 and t2 is almost equal to the time taken to create the CG image. As indicated by a point 402, the position and orientation measured by the position and orientation sensor 105 at the time t2, that is, the position and orientation of the viewpoint for the camera is calculated at the time t2.

A time t3 indicates a display timing of the composite image. The difference between the times t2 and t3 is almost equal to the time taken for the camera image processing and the time taken to composite the physical space image and the CG image. As indicated by a point 403, the position and orientation measured by the position and orientation sensor 105 at the time t3, that is, the position and orientation of the current viewpoint is calculated at the time t3.

As described above, since it takes time until the composite image is generated, the position and orientation of the viewpoint for the CG image used to generate the CG image is different from that of the camera 203 which has sensed the physical space image to be composited with the generated CG image.

This also applies to a case in which the observer moves his/her head 301 in the vertical direction or the movement direction is different.

The influence exerted on a composite image of a CG image and a physical space image by the movement of the observer's head 301 will be described with reference to FIGS. 5A-a, 5A-b, 5B-a, 5B-b, 5C-a, and 5C-b.

FIGS. 5A-a and 5A-b are views for explaining the composite image when the observer turns his/her head 301 clockwise in the horizontal direction.

FIG. 5A-a is a view when the head 301 of the observer wearing the HMD 101 on the head is viewed from above. The observer turns his/her head 301 clockwise within the horizontal plane as indicated by the arrow A in FIG. 5A-a.

FIG. 5A-b is a view showing a composite image example generated in this case. Reference numeral 501a denotes a composite image; 501b and 501d, physical objects within a physical space image; and 501c, a virtual object as a CG image. Assume that an image obtained by superimposing the virtual object 501c on the physical object 501d is displayed. When the head 301 is stationary, the image obtained by superimposing the virtual object 501c on the physical object 501d is displayed. If, however, the observer rotates his/her head 301 clockwise as shown in FIG. 5A-a, the orientation of the camera 203 at the time when generation of the image of the virtual object 501c is complete will have rotated clockwise from the orientation of the camera 203 used to generate the virtual object 501c. As shown in FIG. 5A-b, the virtual object 501c is composited at a position shifted rightward from the physical object 501d.

FIGS. 5B-a and 5B-b are views for explaining a composite image when the observer moves his/her head 301 in the vertical direction.

FIG. 5B-a is a view when the head 301 of the observer wearing the HMD 101 on the head is viewed from the side. The observer moves his/her head 301 upward in the vertical direction as indicated by an arrow B in FIG. 5B-a.

FIG. 5B-b is a view showing a composite image example to be generated in this case. Reference numeral 502a denotes a composite image; 502b and 502d, physical objects within a physical space image; and 502c, a virtual object as a CG image. Assume that an image obtained by superimposing the virtual object 502c on the physical object 502d is displayed. When the head 301 is stationary, the image obtained by superimposing the virtual object 502c on the physical object 502d is displayed. If, however, the observer rotates his/her head 301 upward as shown in FIG. 5B-a, the orientation of the camera 203 at the time when generation of the image of the virtual object 502c is complete will have rotated upward from the orientation of the camera 203 used to generate the virtual object 502c. As shown in FIG. 5B-b, the virtual object 502c is composited at a position shifted upward from the physical object 502d.

FIGS. 5C-a and 5C-b are views for explaining a composite image when the observer rotates (inclines) his/her head 301 about the center of his/her face in a rolling direction (clockwise).

FIG. 5C-a is a view when the head 301 of the observer wearing the HMD 101 on the head is viewed from the front. As indicated by an arrow C in FIG. 5C-a, the observer rotates (inclines) his/her head 301 about the center of his/her face in the rolling direction (clockwise).

FIG. 5C-b is a view showing a composite image example to be generated in this case. Reference numeral 503a denotes a composite image; 503b and 503d, physical objects within a physical space image; and 503c, a virtual object as a CG image. An image obtained by superimposing the virtual object 503c on the physical object 503d is displayed. When the head 301 is stationary, the image obtained by superimposing the virtual object 503c on the physical object 503d is displayed. If, however, the observer rotates his/her head 301 about the center of his/her face in the rolling direction as shown in FIG. 5C-*a*, the orientation of the camera 203 at the time when generation of the image of the virtual object 503*c* is complete will have rotated clockwise from the orientation of the camera 203 used to generate the virtual object 503*c*. As shown in FIG. 5C-*b*, the virtual object 503*c* is composited at a rotation position immediately before the physical object 503*d*.

A process for correcting the thus occurred shift of the CG image will be described with reference to FIG. 6. FIG. 6 is a view for explaining the process for eliminating a composition position shift of a CG image, which occurs on a physical space image due to the movement of the head 301. A case in which the orientation of the head 301 is changed within the horizontal plane will be described with reference to FIG. 6.

Referring to FIG. 6, reference symbol Cx denotes angle-of-view information representing the angle of view of the camera 203 in the horizontal direction. Assume that the number M of pixels of the display unit 213 in the horizontal direction (resolution information) is 1280. Reference symbol Δθx denotes a shift of an orientation component in the horizontal direction between the position and orientation information (the first position and orientation information) held by the CG viewpoint storage unit 208 at around the display timing and the position and orientation information (the second position and orientation information) held by the camera viewpoint storage unit 207 at around the display timing. More specifically, the shift Δθx represents the remainder (difference amount) obtained by subtracting the orientation component in the horizontal direction of the orientation components represented by the first position and orientation information from the orientation component in the horizontal direction of the orientation components represented by the second position and orientation information.

When the CG image held by the CG buffer 209 at around the display timing of the display unit 213 is composited on the physical space image sent from the camera image processing unit 204 at around the display timing of the display unit 213, a shift amount P of the composition position is determined based on the following equation:

$$P = M \times \Delta\theta x / Cx$$

A case in which Δθx is 1° will be described as an example. When the angle Cx of view of the camera 203 is 60° and the number M of pixels of the display unit 213 in the horizontal direction is 1280, P=(1/60)×1280≈213. Therefore, the CG image shifted leftward by about 213 pixels is composited on the physical space image, or the CG image is composited on the physical space image shifted rightward by about 213 pixels (if the orientation component value increases clockwise). When Δθx takes a negative value, P also takes a negative value. In this case, the CG image is shifted rightward by |P| pixels, or the physical space image is shifted leftward by |P| pixels.

When the observer moves his/her head 301 in any direction (e.g., in the horizontal and vertical directions, or only in the vertical direction) other than the horizontal direction, the above-described process is executed for each direction. For example, assume that the observer moves his/her head 301 in the vertical direction. If P takes a positive value, the CG image is shifted downward by P pixels. If P takes a negative value, the CG image is shifted upward by |P| pixels (if the orientation component value increases in the upward direction). This applies to the physical space image.

The above-described process of calculating a shift amount is executed by the viewpoint information calculation unit 710. In this embodiment, either the CG image or the physical space image is shifted instead of shifting them both. Which of the CG image and the physical space image is shifted is determined as follows. This determination is made by the viewpoint information calculation unit 710.

Upon reception of the position and orientation information (reference position and orientation information) from the viewpoint information detection unit 202 at around the display timing of the display unit 213, the viewpoint information calculation unit 710 calculates the first difference value between the reference position and orientation information and the position and orientation information held by the camera viewpoint storage unit 207 at this time. The display timing is generated at intervals of 1/60 sec. The unit 710 calculates the second difference value between the reference position and orientation information and the position and orientation information held by the CG viewpoint storage unit 208. The unit 710 compares the magnitude of the absolute value of the first difference value with that of the absolute value of the second difference value (comparison of magnitudes). If the absolute value of the first difference value is smaller than that of the second difference value, the unit 710 sends the shift amount calculated by the above-described process to the CG image position correction unit 211, and also sends the shift amount "0" to the camera image position correction unit 714. If the absolute value of the first difference value is equal to or larger than that of the second difference value, the unit 710 sends the shift amount calculated by the above-described process to the camera image position correction unit 714, and also sends the shift amount "0" to the CG image position correction unit 211.

The CG image position correction unit 211 shifts the CG image stored in the CG buffer 209 by the shift amount calculated by the viewpoint information calculation unit 710, and sends the shifted image to the composition processing unit 705. If the CG image position correction unit 211 receives the shift amount "0", it sends the CG image stored in the CG buffer 209 to the subsequent composition processing unit 705 without any change.

The camera image position correction unit 714 shifts the physical space image received from the camera image processing unit 204 by the shift amount received from the viewpoint information calculation unit 710, and sends the shifted image to the composition processing unit 705. If the unit 714 receives the shift amount "0", it sends the physical space image received from the camera image processing unit 204 to the subsequent composition processing unit 705 without any change.

The composition processing unit 705 composites the CG image received from the CG image position correction unit 211 on the physical space image received from the camera image position correction unit 714. With this composition process, the following composite image can be obtained. That is, the composite image is obtained by compositing the CG image, whose composition position is shifted from the true position by the shift amount calculated by the viewpoint information calculation unit 710, on the physical space image, or by compositing the CG image on the physical space image shifted from the true position by the shift amount calculated by the viewpoint information calculation unit 710.

The composite image generated by the composition process is rendered on the display buffer 212. A phrase "true position" represents a position on a projection plane when a virtual object in the virtual space is projected onto the projection plane. In FIG. 5A-*b*, the true position of the virtual object 501*c* is a position at which the virtual object 501*c* overlaps with the physical object 501*d*.

The display unit 213 displays the composite image rendered on the display buffer 212.

This embodiment has been described on the assumption that the operation (arrangement) of providing a composite image to the right eye of the observer is independent of the operation (arrangement) of providing a composite image to the left eye. The arrangement of the HMD 101 shown in FIG. 2 may be used for both eyes. When this arrangement is employed, the simpler arrangement is implemented, thereby decreasing the cost for the HMD 101.

In this embodiment, assume that the sizes of the CG image and physical space image are larger than the screen size of the display unit 213. This makes it possible to reduce the occurrence of regions within which no image exists even when the composition position of any one of the CG image and the physical space image is corrected.

The term "at the time" used in the embodiments means "at or around the time". For example, "the time of storing" does not represent only "the moment of storing" but represents a time range (e.g., 1/100 sec before and after the "moment") well-balanced in the computer processing field. This also applies to the term "timing".

Figure 9:
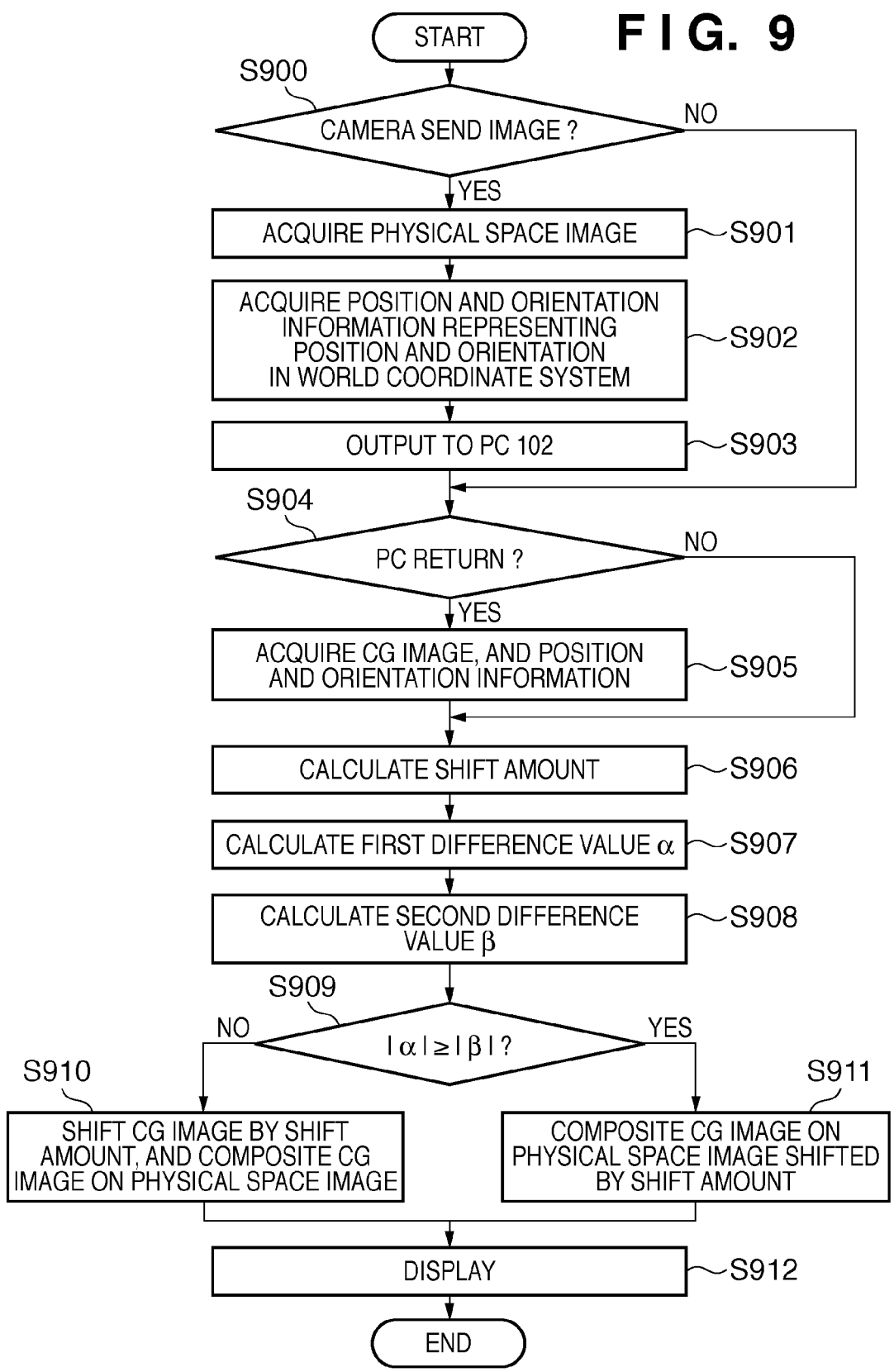
FIG. 9 is a flowchart of a process executed by the HMD 101 to generate and display a composite image.

FIG. 9 is a flowchart of a process (a control method for the HMD 101) executed by the HMD 101 to generate and display a composite image. Processes in steps shown in FIG. 9 are as described above, and a brief explanation thereof will be given.

If the camera 203 sends the physical space image sensed by itself to the camera viewpoint storage unit 207, the process advances to step S901 via step S900; otherwise, the process advances to step S904.

In step S901, the camera viewpoint storage unit 207 acquires the physical space image sensed by the camera 203 and the camera image processing unit 204 acquires that physical space image. The camera image processing unit 204 executes the various processes described above on the acquired physical space image. The unit 204 sends the processed image to the subsequent camera image position correction unit 714.

In step S902, the viewpoint information detection unit 202 acquires the position and orientation information representing the position and orientation measured by the position and orientation sensor 105, and stores the acquired information in the camera viewpoint storage unit 207.

In step S903, the viewpoint information detection unit 202 transmits the position and orientation information acquired in step S902 to the PC 102. If the world coordinate system does not match the sensor coordinate system, the unit 202 converts, by using the position and orientation relationship between the sensor coordinate system and the world coordinate system, the position and orientation measured by the position and orientation sensor 105 to calculate position and orientation information. The unit 202 sends the calculated position and orientation information to the PC 102.

If the PC 102 returns the CG image data and the position and orientation information, the process advances to step S905 via step S904; otherwise, the process advance step S906.

In step S905, the CG image data transmitted from the PC 102 is stored in the CG buffer 209, and the position and orientation information returned to the HMD 101 is stored in the CG viewpoint storage unit 208.

In step S906, the viewpoint information calculation unit 710 calculates the shift amount P.

The viewpoint information calculation unit 710 calculates the first difference value α in step S907, and the second difference value β in step S908. If |α|<|β|, the process advances to step S910 via step S909; otherwise, the process advances to step S911 via step S909.

In step S910, the CG image position correction unit 211 shifts the CG image stored in the CG buffer 209 by the shift amount calculated by the viewpoint information calculation unit 710 in step S906, and sends the processed CG image to the subsequent composition processing unit 705. The composition processing unit 705 executes a composition process of the CG image sent from the CG image position correction unit 211 and the physical space image sent from the camera image position correction unit 714. A composite image generated by the composition process is rendered on the display buffer 212.

In step S911, the camera image position correction unit 714 shifts the physical space image received from the camera image processing unit 204 by the shift amount calculated by the viewpoint information calculation unit 710 in step S906, and sends the processed physical space image to the subsequent composition processing unit 705. The composition processing unit 705 executes a composition process of the CG image sent from the CG image position correction unit 211 and the physical space image sent from the camera image position correction unit 714. A composite image generated by the composition process is rendered on the display buffer 212.

In step S912, the display unit 213 displays the composite image rendered on the display buffer 212.

As described above, according to this embodiment, it is possible to decrease a composition position shift of a CG image due to the movement of the head of the observer wearing the HMD 101 on the head. In the process of decreasing a shift, it is possible to obtain a shift amount by calculating the above simple linear equation $P=M \times \Delta\theta x/Cx$. Therefore, the process of decreasing a shift takes a relatively short time.

Second Embodiment

In this embodiment, a CG image and physical space image both of which have been shifted are composited. That is, a process corresponding to a flowchart obtained by modifying the flowchart of FIG. 9 by omitting step S909 and changing the flowchart so as to execute both steps S910 and S911, is performed. Furthermore, a shift $\Delta\theta$ used to calculate a shift amount used in step S910 is different from a shift $\Delta\theta$ used to calculate a shift amount used in step S911.

The shift $\Delta\theta$ for step S910 represents the remainder (difference amount) obtained by subtracting the orientation component in the horizontal direction of the orientation components represented by the first position and orientation information from the orientation component in the horizontal direction of the orientation components represented by the reference position and orientation information. That is, the shift $\Delta\theta$ for step S910 represents the first difference value.

The shift $\Delta\theta$ for step S911 represents the remainder (difference amount) obtained by subtracting the orientation component in the horizontal direction of the orientation components represented by the second position and orientation information from the orientation component in the horizontal direction of the orientation components represented by the reference position and orientation information. That is, the shift $\Delta\theta$ for step S911 represents the second difference value.

Third Embodiment

The outer appearance of a system to which an HMD according to this embodiment is applied is similar to that in the first embodiment, and thus the outer appearance shown in FIG. 1 will be used. In this embodiment, the different points from the first embodiment will be described below.

The arrangement of an HMD 101 will be described in more detail. FIG. 2 is a block diagram showing the functional arrangement of the HMD 101. In FIG. 2, the same reference numerals as those in FIG. 1 denote the same components, and a description thereof will be omitted.

Of components of the HMD 101 in FIG. 2, all the components except for a position and orientation sensor 105 are provided for each of the right and left eyes of an observer wearing the HMD 101 on the head. Although the components of the HMD 101 for one eye are shown in FIG. 2, similar components also execute operations to be described below for the other eye.

A viewpoint information detection unit 202 receives position and orientation information representing the position and orientation measured by the position and orientation sensor 105, and transfers the information to an external PC 102 without any change (the second acquisition). If a world coordinate system does not match a sensor coordinate system, the unit 202 converts, by using the position and orientation relationship between the sensor coordinate system and the world coordinate system, the position and orientation measured by the position and orientation sensor 105 to calculate position and orientation information. The unit 202 sends the calculated position and orientation information to the PC 102.

Upon reception of the position and orientation information from the viewpoint information detection unit 202, the PC 102 adds the position and orientation relationship between the position and orientation sensor 105 and a camera 203, which has been calculated in advance, to the position and orientation represented by the received position and orientation information. This makes it possible to calculate the position and orientation information representing the position and orientation of the camera 203 (viewpoint). The viewpoint having the position and orientation of the camera 203 is set in a virtual space. Assume that a coordinate system in the virtual space matches the world coordinate system. Assume also that one or more virtual objects form the virtual space. The PC 102 generates an image (CG image) (virtual space image) of the virtual space seen from the set viewpoint. A process for generating an image of a virtual space seen from the viewpoint having the predetermined position and orientation is known, and a description thereof will be omitted. Together with the generated CG image data, the PC 102 returns, to the HMD 101, the position and orientation information which has been received from the viewpoint information detection unit 202 to generate the CG image.

The CG image data transmitted to the HMD 101 is stored in a CG buffer 209. The position and orientation information returned to the HMD 101 is stored in a CG viewpoint storage unit 208.

Images (physical space images) of frames sensed by the camera 203 are sequentially sent to subsequent camera viewpoint storage unit 207 and camera image processing unit 204.

In addition to the position and orientation information sent from the viewpoint information detection unit 202, the physical space image from the camera 203 is input to the camera viewpoint storage unit 207 (the first acquisition). The camera viewpoint storage unit 207 manages the position and orientation information input from the viewpoint information detection unit 202 and the physical space image input from the camera 203 at almost the timing when the position and orientation information is input to the camera viewpoint storage unit 207 in association with each other. In other words, the camera viewpoint storage unit 207 acquires the position and orientation information representing the position and orientation which has been measured by the position and orientation sensor 105 at the time of sensing the physical space image.

The camera image processing unit 204 executes known correction processing on the physical space image received from the camera 203. The unit 204 sends the corrected physical space image to a subsequent composition processing unit 205.

When the CG image stored in the CG buffer 209 is composited on the physical space image output from the camera image processing unit 204, a viewpoint information calculation unit 210 calculates a "shift amount" by which the CG image is shifted to be composited on the physical space image, by using a process to be described later.

A CG image position correction unit 211 instructs the composition processing unit 205 to shift the CG image stored in the CG buffer 209 by the shift amount calculated by the viewpoint information calculation unit 210.

The composition processing unit 205 composites the CG image stored in the CG buffer 209 on the physical space image which has been sent from the camera image processing unit 204 at the time of storing the position and orientation information in the CG viewpoint storage unit 208. In this case, assume that a composition position of the CG image is a position shifted from the true position by the shift amount calculated by the viewpoint information calculation unit 210. A composite image generated by the composition process is rendered on a display buffer 212.

The composite image rendered on the display buffer 212 is displayed on a display unit (display device) 213.

A process for correcting a shift of a CG image will be described next with reference to FIG. 6. FIG. 6 is a view for explaining a process for eliminating a composition position shift of a CG image, which occurs in a physical space image due to the movement of a head 301. A case in which the orientation of the head 301 is changed within the horizontal plane will be described with reference to FIG. 6.

Referring to FIG. 6, reference symbol Cx denotes angle-of-view information representing the angle of view of the camera 203 in the horizontal direction. Assume that the number M of pixels of the display unit 213 in the horizontal direction (resolution information) is 1280. Reference symbol $\Delta\theta x$ denotes a shift of an orientation component in the horizontal direction between the position and orientation information (the first position and orientation information) stored in the CG viewpoint storage unit 208 and the position and orientation information (the second position and orientation information) stored in the camera viewpoint storage unit 207 at the time of storing the first position and orientation information. More specifically, the shift $\Delta\theta x$ represents the remainder (difference amount) obtained by subtracting the orientation component in the horizontal direction of the orientation components represented by the first position and orientation information from the orientation component in the horizontal direction of the orientation components represented by the second position and orientation information.

If the CG image is composited on the physical space image sent from the camera image processing unit 204 at the time when the CG image data is stored in the CG buffer 209, a shift amount P of the composition position is determined based on the following equation:

$$P = M \times \Delta\theta x / Cx$$

Assume that $\Delta\theta x$ is 1°. Assume also that the orientation represented by the orientation component of the position and orientation information transmitted to the PC 102 is shifted by 1° to the orientation represented by the orientation component of the position and orientation information stored in the camera viewpoint storage unit 207 at the time when the CG image data is received from the PC 102. When the angle Cx of view of the camera 203 is 60° and the number M of pixels of the display unit 213 in the horizontal direction is 1280, P=(1/60)×1280≈213. Therefore, the CG image shifted leftward by about 213 pixels is composited on the physical space image. When Δθx takes a negative value, P also takes a negative value. In this case, the CG image is shifted rightward by |P| pixels.

When the observer moves his/her head 301 in any directions (e.g., in the horizontal and vertical directions, or only in the vertical direction) other than the horizontal direction, the above-described process is executed for each direction. For example, assume that the observer moves his/her head 301 in the vertical direction. If P takes a positive value, the CG image is shifted downward by P pixels. If P takes a negative value, the CG image is shifted upward by |P| pixels.

The above-described process of calculating a shift amount is executed by the viewpoint information calculation unit 210. The CG image position correction unit 211 instructs the composition processing unit 205 to shift the CG image stored in the CG buffer 209 by the shift amount calculated by the viewpoint information calculation unit 210.

The composition processing unit 205 composites the CG image stored in the CG buffer 209 on the physical space image which has been sent from the camera image processing unit 204 at the time of storing the position and orientation information in the CG viewpoint storage unit 208. At this time, the CG image, whose composition position is shifted from the true composition position by the shift amount calculated by the viewpoint information calculation unit 210, is composited on the physical space image. A composite image generated by the composition process is rendered on the display buffer 212. A phrase "true composition position" represents a position on a projection plane when a virtual object in the virtual space is projected onto the projection plane. In FIG. 5A-b, the true composition position of a virtual object 501c is a position at which the virtual object 501c overlaps with the physical object 501d.

The display unit 213 displays the composite image rendered on the display buffer 212.

This embodiment has been described on the assumption that the operation (arrangement) of providing a composite image to the right eye of the observer is independent of the operation (arrangement) of providing a composite image to the left eye. The arrangement of the HMD 101 shown in FIG. 2 may be used for both eyes. When this arrangement is employed, a simpler arrangement is implemented, thereby decreasing the cost for the HMD 101.

In this embodiment, assume that the size of the composition range of the CG image is larger than that of the physical space image. This makes it possible to reduce the occurrence of regions within which no CG image exists even when the composition position of the CG image is corrected.

Figure 7:
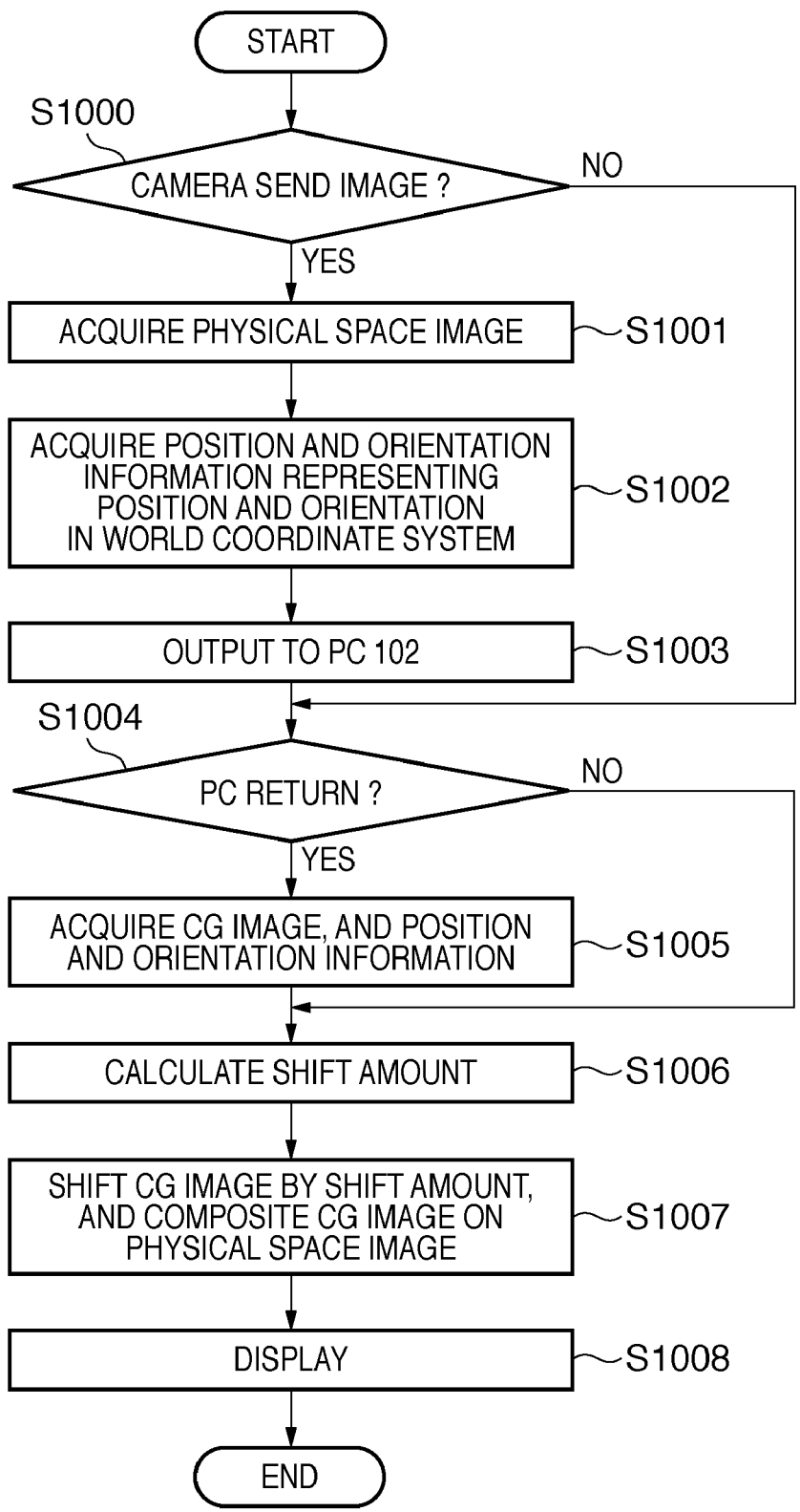
FIG. 7 is a flowchart of a process executed by the HMD 101 to generate and display a composite image.

FIG. 7 is a flowchart of a process (a control method for the HMD 101) executed by the HMD 101 to generate and display a composite image. Processes in steps shown in FIG. 7 are as described above, and a brief explanation thereof will be given.

If the camera 203 sends the physical space image sensed by itself to the camera viewpoint storage unit 207, the process advances to step S1001 via step S1000; otherwise, the process advances to step S1004.

In step S1001, the camera viewpoint storage unit 207 and the camera image processing unit 204 acquire the physical space image sensed by the camera 203. In this step, the camera viewpoint storage unit 207 manages the position and orientation information input from the viewpoint information detection unit 202 and the physical space image input from the camera 203 at almost the timing when the position and orientation information is input to the camera viewpoint storage unit 207 in association with each other. Furthermore, in this step, the camera image processing unit 204 executes known correction processing on the physical space image received from the camera 203. The camera image processing unit 204 sends the corrected physical space image to the subsequent composition processing unit 205.

In step S1002, the viewpoint information detection unit 202 acquires the position and orientation information representing the position and orientation measured by the position and orientation sensor 105. If the world coordinate system does not match the sensor coordinate system, the unit 202 converts, by using the position and orientation relationship between the sensor coordinate system and the world coordinate system, the position and orientation measured by the position and orientation sensor 105 to calculate position and orientation information.

In step S1003, the viewpoint information detection unit 202 sends, to the PC 102, the position and orientation information of the position and orientation sensor 105 in the world coordinate system, which has been acquired or calculated in step S1002.

If the PC 102 returns the CG image data and the position and orientation information, the process advances to step S1005 via step S1004; otherwise, the process advances to step S1006.

In step S1005, the CG image data transmitted from the PC 102 is stored in the CG buffer 209, and the position and orientation information returned to the HMD 101 is stored in the CG viewpoint storage unit 208.

In step S1006, the viewpoint information calculation unit 210 calculates the shift amount P.

In step S1007, the CG image position correction unit 211 instructs the composition processing unit 205 to shift the CG image stored in the CG buffer 209 by the shift amount calculated by the viewpoint information calculation unit 210. The composition processing unit 205 composites the CG image stored in the CG buffer 209 on the physical space image which has been sent from the camera image processing unit 204 at the time of storing the position and orientation information in the CG viewpoint storage unit 208. In this case, assume that the composition position of the CG image is a position shifted from the true composition position by the shift amount calculated by the viewpoint information calculation unit 210. A composite image generated by the composition process is rendered on the display buffer 212.

In step S1008, the display unit 213 displays the composite image rendered on the display buffer 212.

As described above, according to this embodiment, it is possible to decrease a composition position shift of a CG image due to the movement of the head of the observer wearing the HMD 101 on the head. In the process of decreasing a shift, it is possible to obtain a shift amount by calculating the above simple linear equation P=M×Δθx/Cx. Therefore, the process of decreasing a shift for one frame takes a relatively short time.

Fourth Embodiment

Although the PC 102 returns, without any change, the position and orientation information which has been transmitted from the viewpoint information detection unit 202 to the PC 102 in the first embodiment, the PC 102 may return only the CG image without returning the position and orientation information.

In this case, when transmitting position and orientation information to the PC 102, the viewpoint information calculation unit 210 attaches timing information, such as the transmission time, representing the transmission timing to the position and orientation information, and transmits it to the PC 102. The position and orientation information to which the timing information is attached is also stored in the camera viewpoint storage unit 207.

The PC 102 attaches the timing information to the CG image data generated based on the position and orientation information, and returns the CG image data to the HMD 101.

Upon storing the CG image in the CG buffer 209, the viewpoint information calculation unit 210 refers to the timing information attached to the CG image, and reads out the position and orientation information to which the same timing information is attached. The viewpoint information calculation unit 210 calculates the shift amount P on the basis of the readout position and orientation information and the position and orientation information acquired from the position and orientation sensor 105 at this time.

The above-described embodiments may be partly used in combination as needed.

Other Embodiments

The object of the present invention is achieved by the following process. That is, a recording medium (or storage medium) which records software program codes for implementing the functions of the above-described embodiments is supplied to a system or apparatus. The storage medium is a computer-readable storage medium. A computer (or a CPU or MPU) of the system or apparatus reads out and executes the program codes stored in the recording medium. In this case, the program codes read out from the recording medium implement the functions of the above-described embodiments, and the recording medium which records the program codes constitutes the present invention.

The present invention includes a case in which the functions of the above-described embodiments are implemented when the computer executes the readout program codes and an operating system (OS) or the like running on the computer performs some or all of actual processes based on the instructions of the program codes.

Furthermore, the present invention includes a case in which, after the program codes read out from the recording medium are written in the memory of a function expansion card inserted into the computer or the memory of a function expansion unit connected to the computer, the CPU of the function expansion card or function expansion unit performs some or all of actual processes based on the instructions of the program codes and thereby implements the functions of the above-described embodiments.

When the present invention is applied to the recording medium, the recording medium stores the program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-146092, filed May 31, 2007, which is hereby incorporated by reference herein in its entirety.

What is claimed is:

1. A head mounted display including an image sensing device, a display device, and a position and orientation sensor, comprising:

an acquisition unit adapted to acquire, every time receiving a physical space image sequentially sensed by the image sensing device, position and orientation information representing a position and orientation which has been measured by the position and orientation sensor at the time of sensing the received physical space image, and record the position and orientation information together with the received physical space image in a first memory;

a transmission unit adapted to transmit the position and orientation information acquired by the acquisition unit to an external computer;

a reception unit adapted to receive, from the computer, the position and orientation information transmitted by the transmission unit and a virtual space image generated by the computer on the basis of the position and orientation information, and record the received position and orientation information and the received virtual space image in a second memory;

a calculation unit adapted to calculate a difference amount of an orientation component between the latest position and orientation information held in the first memory at a display timing of the display device and the latest position and orientation information held in the second memory at the display timing;

a unit adapted to calculate a first difference value between the position and orientation information acquired by the acquisition unit at around the display timing of the display device and the latest position and orientation information held in the first memory;

a unit adapted to calculate a second difference value between the position and orientation information acquired by the acquisition unit at around the display timing of the display device and the latest position and orientation information held in the second memory; and a composition unit adapted to composite the latest physical space image held in the first memory at the display timing of the display device and the latest virtual space image held in the second memory at the display timing of the display device, and wherein the composition unit selects, based on a magnitude relationship between the first difference value and the second difference value, either a composition process of shifting a virtual space image to be composited by a shift amount calculated in accordance with resolution information representing a resolution of the display device, the difference amount, and angle-of-view information representing an angle of view of the image sensing device and compositing the shifted virtual space image, or a composition process of shifting a physical space image to be composited by a shift amount calculated in accordance with the resolution information representing the resolution of the display device, the difference amount, and the angle-of-view information representing the angle of view of the image sensing device and compositing the shifted physical space image, and the composition unit executes the selected composition process.

2. The display according to claim 1, wherein the composition unit shifts the physical space image to be composited when an absolute value of the first difference value is equal to or larger than that of the second difference value, and shifts the virtual space image to be composited when the absolute value of the first difference value is smaller than that of the second difference value.

3. The display according to claim 2, wherein the composition unit calculates the shift amount P=M×Δθx/Cx, and shifts the physical space image or the virtual space image by the calculated shift amount P, where M represents the resolution of the display device, Δθx represents the difference amount, and Cx represents the angle of view of the image sensing device.

4. A control method for a head mounted display including an image sensing device, a display device, and a position and orientation sensor, comprising:
  an acquisition step of acquiring, every time receiving a physical space image sequentially sensed by the image sensing device, position and orientation information representing a position and orientation which has been measured by the position and orientation sensor at the time of sensing the received physical space image, and recording the position and orientation information together with the received physical space image in a first memory;
  a transmission step of transmitting the position and orientation information acquired in the acquisition step to an external computer;
  a reception step of receiving, from the computer, the position and orientation information transmitted in the transmission step and a virtual space image generated by the computer on the basis of the position and orientation information, and recording the received position and orientation information and the received virtual space image in a second memory;
  a calculation step of calculating a difference amount of an orientation component between the latest position and orientation information held in the first memory at a display timing of the display device and the latest position and orientation information held in the second memory at the display timing;
  a step of calculating a first difference value between the position and orientation information acquired in the acquisition step at around the display timing of the display device and the latest position and orientation information held in the first memory;
  a step of calculating a second difference value between the position and orientation information acquired in the acquisition step at around the display timing of the display device and the latest position and orientation information held in the second memory; and
  a composition step of compositing the latest physical space image held in the first memory at the display timing of the display device and the latest virtual space image held in the second memory at the display timing of the display device, and
  wherein the composition step includes, a step of selecting, based on a magnitude relationship between the first difference value and the second difference value, either a composition process of shifting a virtual space image to be composited by a shift amount calculated in accordance with resolution information representing a resolution of the display device, the difference amount, and angle-of-view information representing an angle of view of the image sensing device and compositing the shifted virtual space image, or a composition process of shifting a physical space image to be composited by the shift amount calculated in accordance with the resolution information representing the resolution of the display device, the difference amount, and the angle-of-view information representing the angle of view of the image sensing device and compositing the shifted physical space image, and a step of executing the selected composition process.

5. An apparatus including an image sensing device, a display device, and a position and orientation sensor, comprising:
  an acquisition unit adapted to acquire, every time receiving a physical space image sequentially sensed by the image sensing device, position and orientation information representing a position and orientation which has been measured by the position and orientation sensor at the time of sensing the received physical space image, and record the position and orientation information together with the received physical space image in a first memory;
  a transmission unit adapted to transmit the position and orientation information acquired by the acquisition unit to an external computer;
  a reception unit adapted to receive, from the computer, the position and orientation information transmitted by the transmission unit and a virtual space image generated by the computer on the basis of the position and orientation information, and record the received position and orientation information and the received virtual space image in a second memory;
  a calculation unit adapted to calculate a difference amount of an orientation component between the latest position and orientation information held in the first memory at a display timing of the display device and the latest position and orientation information held in the second memory at the display timing;
  a unit adapted to calculate a first difference value between the position and orientation information acquired by the acquisition unit at around the display timing of the display device and the latest position and orientation information held in the first memory;
  a unit adapted to calculate a second difference value between the position and orientation information acquired by the acquisition unit at around the display timing of the display device and the latest position and orientation information held in the second memory; and
  a composition unit adapted to composite the latest physical space image held in the first memory at the display timing of the display device and the latest virtual space image held in the second memory at the display timing of the display device, and
  wherein the composition unit selects, based on a magnitude relationship between the first difference value and the second difference value, either a composition process of shifting a virtual space image to be composited by a shift amount calculated in accordance with resolution information representing a resolution of the display device, the difference amount, and angle-of-view information representing an angle of view of the image sensing device and compositing the shifted virtual space image, or a composition process of shifting a physical space image to be composited by a shift amount calculated in accordance with the resolution information representing the resolution of the display device, the difference amount, and the angle-of-view information representing the angle of view of the image sensing device and compositing the shifted physical space image, and the composition unit executes the selected composition process.

6. A control method for an apparatus including an image sensing device, a display device, and a position and orientation sensor, comprising:

an acquisition step of acquiring, every time receiving a physical space image sequentially sensed by the image sensing device, position and orientation information representing a position and orientation which has been measured by the position and orientation sensor at the time of sensing the received physical space image, and recording the position and orientation information together with the received physical space image in a first memory;

a transmission step of transmitting the position and orientation information acquired in the acquisition step to an external computer;

a reception step of receiving, from the computer, the position and orientation information transmitted in the transmission step and a virtual space image generated by the computer on the basis of the position and orientation information, and recording the receiving position and orientation information and the receiving virtual space image in a second memory;

a calculation step of calculating a difference amount of an orientation component between the latest position and orientation information held in the first memory at a display timing of the display device and the latest position and orientation information held in the second memory at the display timing;

a step of calculating a first difference value between the position and orientation information acquired in the acquisition step at around the display timing of the display device and the latest position and orientation information held in the first memory;

a step of calculating a second difference value between the position and orientation information acquired in the acquisition step at around the display timing of the display device and the latest position and orientation information held in the second memory; and a composition step of compositing the latest physical space image held in the first memory at the display timing of the display device and the latest virtual space image held in the second memory at the display timing of the display device, and wherein in the composition step includes, a step of selecting, based on a magnitude relationship between the first difference value and the second difference value, either a composition process of shifting a virtual space image to be composited by a shift amount calculated in accordance with resolution information representing a resolution of the display device, the difference amount, and angle-of-view information representing an angle of view of the image sensing device and compositing the shifted virtual space image, or a composition process of shifting a physical space image to be composited by the shift amount calculated in accordance with the resolution information representing the resolution of the display device, the difference amount, and the angle-of-view information representing the angle of view of the image sensing device and compositing the shifted physical space image, and a step of executing the selected composition process.

* * * * *